United States Patent [19]
Nanba et al.

[11] Patent Number: 5,153,637
[45] Date of Patent: Oct. 6, 1992

[54] READER PRINTER INCORPORATING SCANNING PLANE MIRROR THEREIN

[75] Inventors: Katsuhiro Nanba, Okazaki; Masamitsu Ishiyama, Toyokawa, both of Japan

[73] Assignee: Minolta Camera Co., Ltd., Osaka, Japan

[21] Appl. No.: 820,555

[22] Filed: Jan. 14, 1992

[30] Foreign Application Priority Data

Jan. 18, 1991 [JP] Japan ................ 3-004100

[51] Int. Cl.$^5$ ............................................ G03B 13/28
[52] U.S. Cl. ................................... 355/45; 355/51; 355/65; 355/233
[58] Field of Search ............... 355/45, 51, 65, 233

[56] References Cited

U.S. PATENT DOCUMENTS

| | | | |
|---|---|---|---|
| 3,844,653 | 10/1974 | Kelly | 355/233 |
| 4,232,960 | 11/1980 | Glab | 355/233 |
| 4,593,990 | 6/1986 | Auer et al. | 355/45 |
| 4,751,553 | 6/1988 | Fukasawa | 355/45 |
| 4,766,461 | 8/1988 | Ohtsuka | 355/45 X |
| 4,857,965 | 8/1989 | Ishii et al. | 355/45 |
| 4,864,359 | 9/1989 | Yamasaki et al. | 355/51 |
| 4,879,572 | 11/1989 | Onuki et al. | 355/45 |
| 4,881,099 | 11/1989 | Onuki et al. | 355/45 |
| 4,919,499 | 4/1990 | Aiba | 355/233 |
| 4,931,828 | 6/1990 | Fujita et al. | 355/45 |
| 5,065,182 | 11/1991 | Fujita et al. | 355/45 X |

FOREIGN PATENT DOCUMENTS

64-70735 3/1989 Japan.
64-70736 3/1989 Japan.

*Primary Examiner*—Richard A. Wintercorn
*Attorney, Agent, or Firm*—Price, Gess & Ubell

[57] ABSTRACT

A reader printer is disclosed which incorporates therein a scanning plane mirror for projecting an image in the form of a slit on a sensitive material. The sensitive material is shifted proportionately to the rotation of the scanning mirror so that the position at which the image is projected on the sensitive material will coincide with the scanning position of the sensitive material. As a result, the otherwise possible phenomenon of defocusing is precluded and the image is faithfully reproduced on a recording paper. The mechanism for rotating the scanning mirror and the mechanism for shifting the sensitive material are divided to allow production of a reader printer of a small size.

16 Claims, 6 Drawing Sheets

READER PRINTER INCORPORATING SCANNING PLANE MIRROR THEREIN

BACKGROUND OF THE INVENTION

1. Field of the Invention

This invention relates to a reader printer which combines the function of projecting an image recorded on a film onto a screen and the function of projecting this image onto a sensitive material thereby forming a reproduced image.

2. Description of the Related Art

Generally a reader printer for use with a microfilm, while operating in the print mode, causes a scanning plane mirror to be moved along a prescribed locus as synchronized with the rotation of a sensitive drum and consequently enables an image on the film to be projected in a scanning pattern onto the surface of the sensitive drum. As an optical system for image projection in the reader printer of the operating principle described above, a device which uses one plane mirror and accomplishes therewith the elimination of defocusing, magnification error, and magnification distortion by causing this plane mirror to rotate and, at the same time, shift while scanning an image has been known to date in the art (U.S. Pat. No. 4,766,461). When the plane mirror is not only rotated but also shifted, the device using this plane mirror entails the disadvantage that the mechanism for driving the plane mirror calls for a large dimensional addition and the operational control for simultaneously rotating and shifting the plane mirror gains in complexity.

SUMMARY OF THE INVENTION

An object of this invention is to provide a reader printer which incorporates therein a scanning plane mirror capable exclusively of a rotary motion and an image-forming medium adapted to be shifted relative to the mirror.

Another object of this invention is to provide a reader printer which eliminates defocusing, magnification error, and magnification distortion and produces a reproduced image of high quality by a simple mechanism.

In accordance with the present invention, there is provided a image-forming apparatus comprising an image-forming medium capable of motion in one direction, image-projecting means capable of projecting an image to be formed on said image-forming medium, a reflecting member disposed rotatably within a path for a beam of rays projected by said image-projecting means and adapted to reflect the projected image in the direction of said image-forming medium, driving means capable of rotating said reflecting member thereby effecting the scanning of the image projected on said image-forming medium, and shift means capable of shifting the scanning position of said image-forming medium synchronously with the rotation of said reflecting member.

In this invention, when the scanning mirror is rotated during the projection of an image recorded on a film onto a sensitive material, the scanning position on the sensitive material is shifted in response to this rotation of the scanning mirror. As a result, the scanning position of the sensitive material is shifted to the position for focusing the projected image and the occurrence of defocusing is precluded and the occurrence of projection magnification error and projection distortion is prevented and the formation of a reproduced image of high quality on a copying paper is accomplished. Further, in consequence of the division of the mechanism for rotating the scanning mirror and the mechanism for shifting the sensitive material, the reader printer enjoys smallness and simplicity of the construction thereof.

DESCRIPTION OF THE PREFERRED EMBODIMENTS

Figure 1:
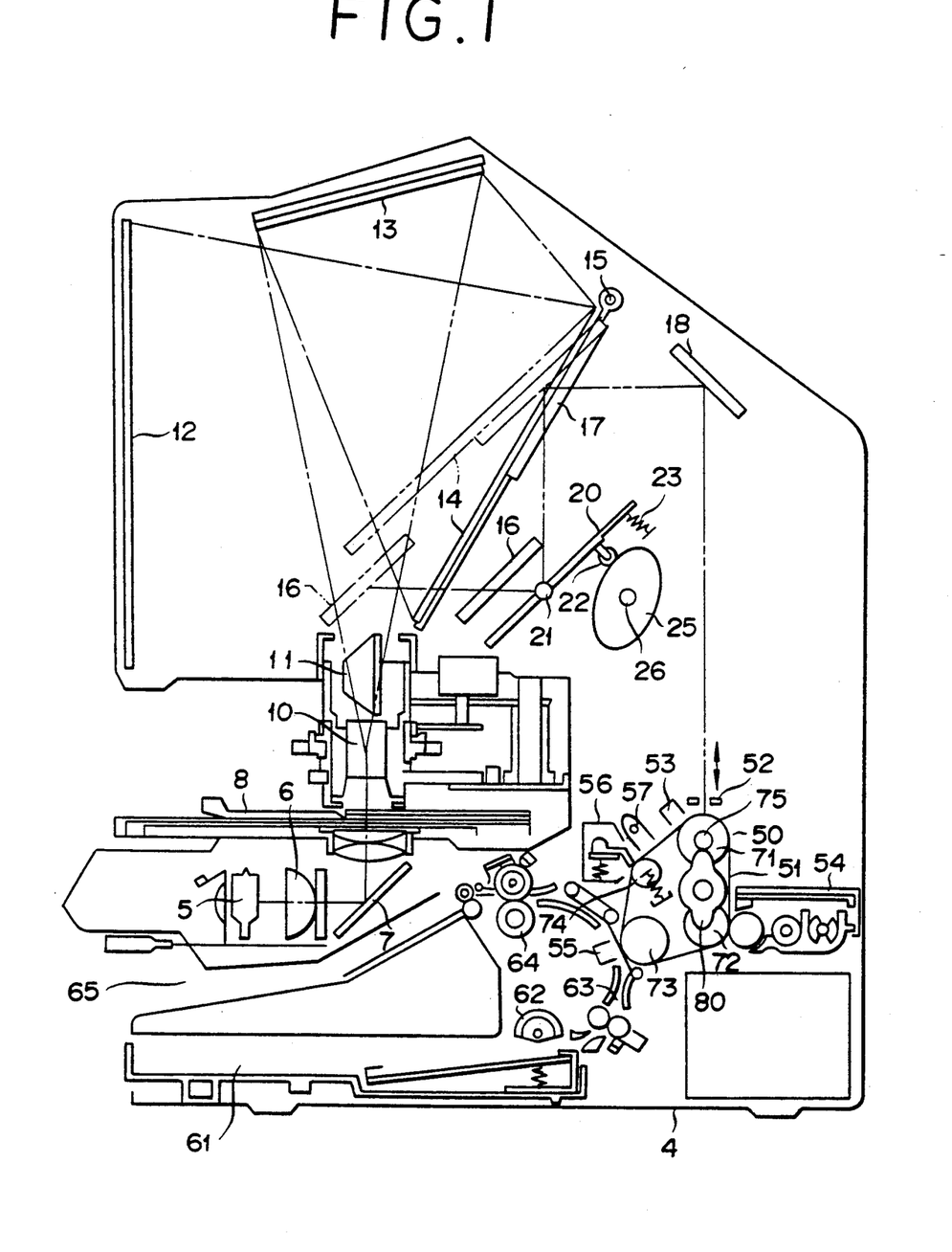
FIG. 1 is a schematic diagram illustrating the inner construction of a reader printer.

A housing 4 of the reader printer, as illustrated in FIG. 1, incorporates in the lower part on the front side thereof a halogen lamp 5 as a light source, a condenser lens 6, and a reflection mirror 7. A film carrier 8 for holding a microfilm is capable of attachment to and detachment from the housing 4. Directly above the reflection mirror 7 are disposed a projection lens 10 and an image-rotating prism 11. Owing to the construction described above, a bundle of rays emitted from the halogen lamp 5 is condensed by the condenser lens 6, then led upwardly, passed through the film held on the film carrier 8, passed further through the projection lens 10 and a prism 11, and projected upwardly.

A screen 12 is set in place on the front side of the housing 4 and a first mirror 13 and a second mirror 14 both for the reader are disposed inside the housing 4. While the reader printer is operating in the reader mode, the bundle of rays which has passed the prism 11 is reflected by the first mirror 13 and the second mirror 14 and projected onto the screen 12. The second mirror 14 is capable of oscillation about a shaft 15 as a fulcrum between the reader position indicated by a solid line and the print position indicated by a two-dot chain line in FIG. 1. During the operation of the reader printer in the reader mode, the second mirror 14 holds the position indicated by a solid line.

A first mirror 16 for printing is disposed to the posterior of the second mirror 14 as tilted by a prescribed angle and enabled by a slide mechanism (not shown) to reciprocate between the reader position indicated by a solid line and the print position indicated by a two-dot chain line in FIG. 1. While the reader printer is operating in the print mode, the first mirror 16 for printing is moved from the position indicated by a solid line to the print position indicated by a two-dot chain line after the second mirror 14 for the reader has retracted to the print position indicated by a two-dot chain line. This first mirror 16 at the position indicated by a two-dot chain line reflects the bundle of rays in the direction of the scanning mirror or a second mirror 20 for the print. The bundle of rays reflected by this mirror 20 is advanced in the direction of a third mirror 17 for the printer which is fixed to the rear side of the second mirror 14 for the reader and brought to a position indicated by a two-dot chain line, and further reflected by a fourth mirror 18 for the print toward a sensitive material 51 of an image-forming unit 50 which will be described specifically herein below.

Figure 2:
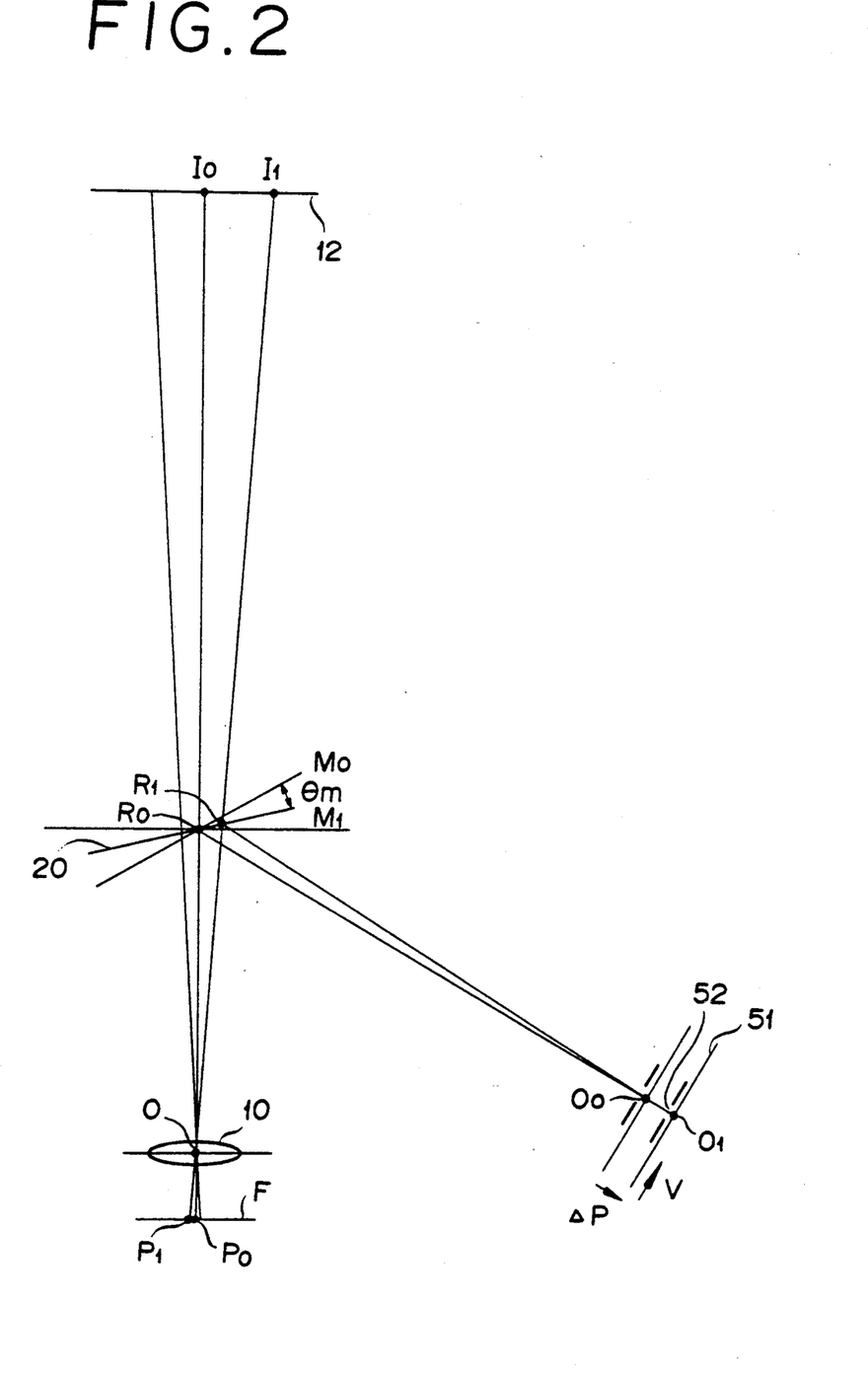
FIG. 2 is a light path diagram intended to aid in the explanation of the rotation of a scanning mirror and the shifting of a sensitive material.

FIG. 2 is an explanatory diagram showing a light path of the image-projecting optical system incorporated in the reader printer described above and depicting the principle of image scanning. This diagram represents a cross section which includes line segments $P_0$, $R_0$, and $I_0$ forming an optical axis of the projection lens 10 and, at the same time, lies perpendicularly to the surface of the sensitive material 51. The sensitive material 51 is moved at a fixed speed V in the direction of an arrow and the bundle of rays regulated by a slit 52 disposed on the surface side of the sensitive material 51 in a direction perpendicular to the direction of movement of the sensitive material is projected onto the part including the scanning position of the sensitive material 51.

The sensitive material 51 is adapted to be shifted in conjunction with the slit 52 in such a manner that the scanning position will move in directions toward and away from the scanning mirror 20. In short, the scanning mirror 20 at the position $M_0$ causes an object point $P_0$ having the optical axis of the projection lens 10 as its principal axis to be focused at the scanning position $O_0$ and at the position $M_1$ causes an object point $P_1$ to be focused at the scanning position $O_1$. While the scanning mirror 20 is rotated from the position $M_1$ to the position $M_0$ so as to change the focusing position from the object point $P_1$ to the object point $P_0$, the scanning position of the sensitive material 51 is shifted from the position $O_1$ to the position $O_0$.

The bundle of rays is projected onto a film F from the hind side so that the image recorded on the film F is focused on the screen 12 when the first mirror 16 for the printer is retracted and the scanning mirror 20 is absent from the field. The points $P_0$ and $P_1$ on the film F are in a conjugate relation respectively with the points $I_0$ and $I_1$ on the screen 12. In FIG. 2, the line segments interconnecting these points and the line segments interconnecting the points of reflection on the scanning mirror 20 and the scanning positions $O_0$ and $O_1$ represent the principal rays of the bundle of rays.

The image of the point $P_1$ on the film F is passed through a pupil 0 of the projection lens 10 and focused at the point $I_1$ on an imaginary image-focusing plane (screen 12). When the scanning mirror 20 is interjected within the field so as to direct the bundle of rays and focus it at the scanning position $O_1$ on the sensitive material 51, the following equations (1) and (2) are satisfied no matter what position the point $P_1$ may occupy. $R_1$ in the equations represents the point of reflection of the bundle of rays from the point $P_1$ on the film F when the scanning mirror 20 has been rotated to the position $M_1$.

$$\text{Line segment } O, R_1, I_1 = \text{Line segment } O, R_1, O_1, \ldots \quad (1)$$

$$\text{Line segment } R_1, I_1 = \text{Line segment } R_1, O_1 \ldots \quad (2)$$

When the inclination of the scanning mirror 20 and the scanning position of the sensitive material are selected so as to satisfy these equations (1) and (2), the light of the optical axis is focused between the scanning positions $O_0$ and $O_1$ proportionately to the angle of rotation $\theta m$ of the scanning mirror 20. When the scanning mirror 20 is rotated and the scanning position is shifted so that the moving speed of the point $I_1$ on the imaginary image-focusing plane will equal a fixed speed V during the movement of the point $I_1$ at the speed V on the surface of the sensitive material 51, the image of its original size is formed without defocusing on the sensitive material 51.

In other words, the defocusing which is generated in the mirror rotation type scanning system because of the nature of the system can be cancelled by shifting the scanning position of the sensitive material 51 in an amount commensurate with the magnitude of the defocusing and the magnification error and the magnification distortion can be eliminated by synchronizing the moving speed V of the surface of the sensitive material and the angle of rotation $\theta m$ of the mirror 20.

The angle of rotation $\theta m$ of the scanning mirror 20 is changed synchronously with the speed V. This change is not an equiangular speed and is determined by the angle with which the principal ray of the image point focused on the sensitive material 51 is emitted from the projection lens 10. The angle of rotation $\theta m$ of the scanning mirror 20, therefore, is a function of the speed V and the angle with which the principal ray of each object point is projected from the projection lens 10. The amount of shift $\Delta P$ of the sensitive material is a function of the angle of rotation $\theta m$ of the scanning mirror 20.

Incidentally, the angle of rotation $\theta m$ of the scanning mirror 20 and the amount of shift $\Delta P$ of the sensitive material 51 are expressed by the following formulas (3) and (4).

$$\theta m = f(\theta x) \ldots \quad (3)$$

$$\Delta P = g(\theta x) \ldots \quad (4)$$

The variable, $\theta x$, used in these formulas represents the angle of projection of an object point from the projection lens 10 (or the imaginary image-focusing position) and is expressed by the following formula (5).

$$\theta x = h(V) + \theta \times O \ldots \quad (5)$$

Here, $\theta \times O$ stands for the angle of inclination of the mirror 20 at the scan starting point.

Figure 3:
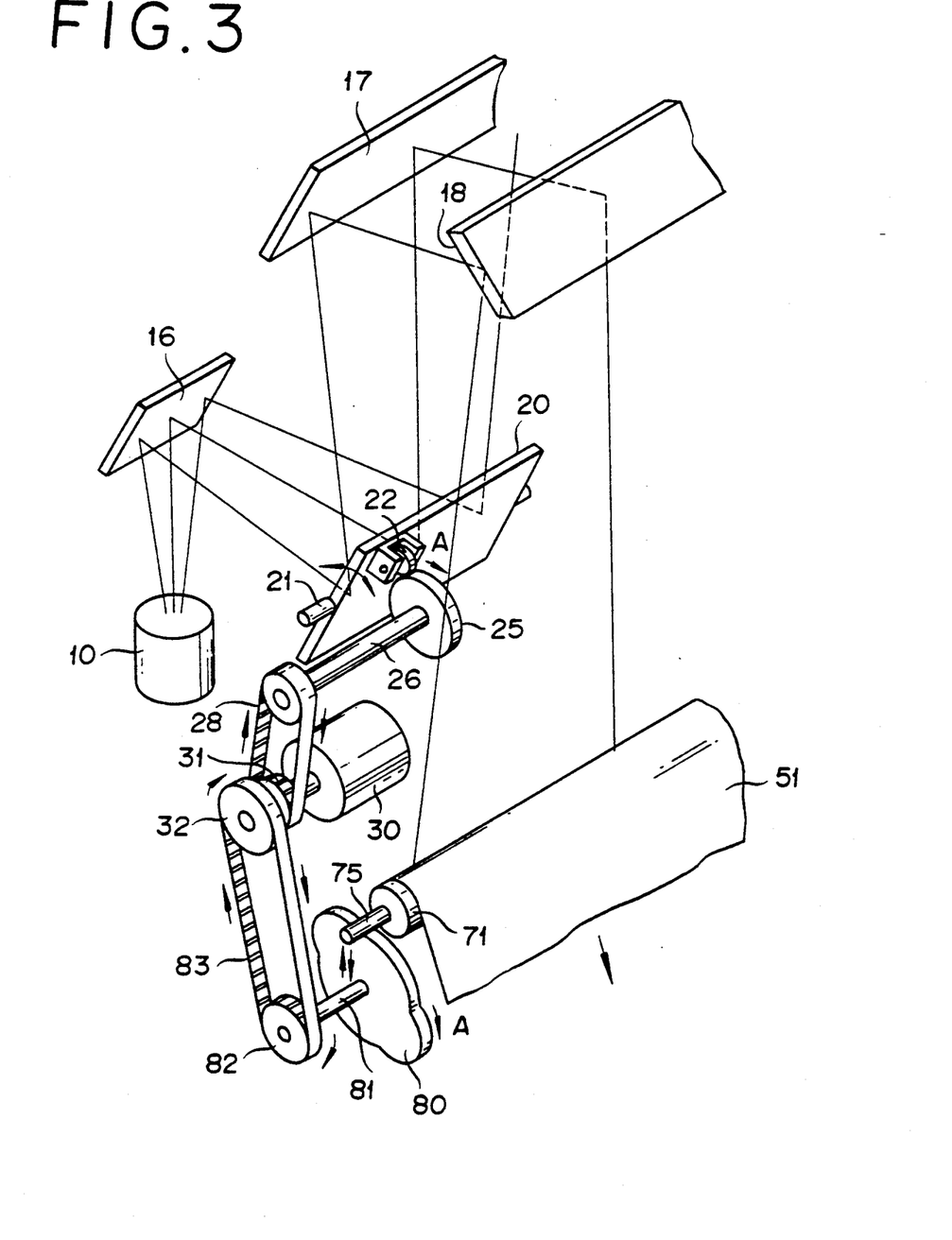
FIG. 3 is a perspective view illustrating the mechanism for rotating the scanning mirror and the mechanism for shifting the sensitive material.

The scanning mirror 20, as illustrated in FIG. 1 and FIG. 3, is adapted to be freely rotated about a rotary shaft 21 as a fulcrum and is provided on the rear side thereof with a roller 22. This mirror 20 is constantly kept urged in the clockwise direction by a tensile coil spring 23 attached to the rear side thereof and the roller 22 is constantly kept in contact with the cam face or the peripheral surface of a cam 25. The cam 25 is fastened to one terminal of a cam shaft 26 supported rotatably on a supporting member (omitted from illustration). A pulley 27 is fastened to the other terminal of the cam shaft 26. A synchronizing belt 28 is passed around a pulley 31 attached to the main shaft of a motor 30 and the pulley 27 mentioned above. When the motor 30 is set into motion, the cam 25 is rotated in the direction indicated by an arrow A and the scanning mirror 20 is rotated within a fixed range abount the rotary shaft 21 as a fulcrum. The cam face of the cam 25 is so shaped as to allow correspondence between the angle of rotation $\theta m$ of the scanning mirror 20 and the angle of projection $\theta x$. The angle of rotation $\theta m$ of the scanning mirror 20 is regulated by the rotation of the motor 30.

The image-forming unit 50 mentioned above is provided with the sensitive material 51 which is shaped like a belt. Around this sensitive belt 51 are disposed an electric charger 53, a developing device 54, a transfer charger 55, a cleaner 56 for removing residual toner, and an eraser lamp 57 for removing residual electric charge. Recording papers contained in a paper feeding cassette 61 are fed out one by one by the rotation of a paper feeding roller 62, reversed in a path 63, and subjected to transfer of a toner image thereto from the sensitive belt 51. Each recording paper to which the toner image has been transferred is subjected to fixation of the toner thereon by a fixing device 64 and then passed through a path 65 and discharged on the front surface side of the reader printer.

The sensitive belt 51 which has an endless construction is passed round rollers 71, 72, 73, and 74, the roller 71 regulating the image scanning position, the roller 72 regulating the developing position, the roller 73 regulating the transfer position, and the roller 74 regulating the cleaning position. The roller 71 is capable of shifting the scanning position from $O_1$ to $O_0$ and further from $O_0$ to $O_1$ in response to the advance of the scanning of an image (the rotation of the scanning mirror 20).

A shifting mechanism is illustrated in FIG. 3. A supporting shaft 75 of the aforementioned roller 71 is supported by a supporting member (omitted from illustration) so as to be freely moved in the shifting direction. This supporting shaft 75 is held in contact with the upper part of the cam face or peripheral surface of a cam 80. A pulley 82 is attached to a cam shaft 81 which is fixed on this cam 80 and a synchronizing belt 83 is passed round this pulley 82 and the pulley 32 fixed on the main shaft of the aforementioned motor 30. The operation of the motor 30, therefore, rotates the cam 80 in the direction indicated by the arrow A and causes the scanning position to be shifted from $O_1$ to $O_0$ to $O_1$ in consequence of the resultant vertical reciprocation of the roller 71. The cam face of the cam 80 is shaped so as to allow correspondence between the amount of shift $\Delta P$ mentioned above and the angle of projection $\theta x$. The rotation of the motor 30 regulates simultaneously the angle of rotation of the scanning mirror 20 and the scanning position.

Figure 5:
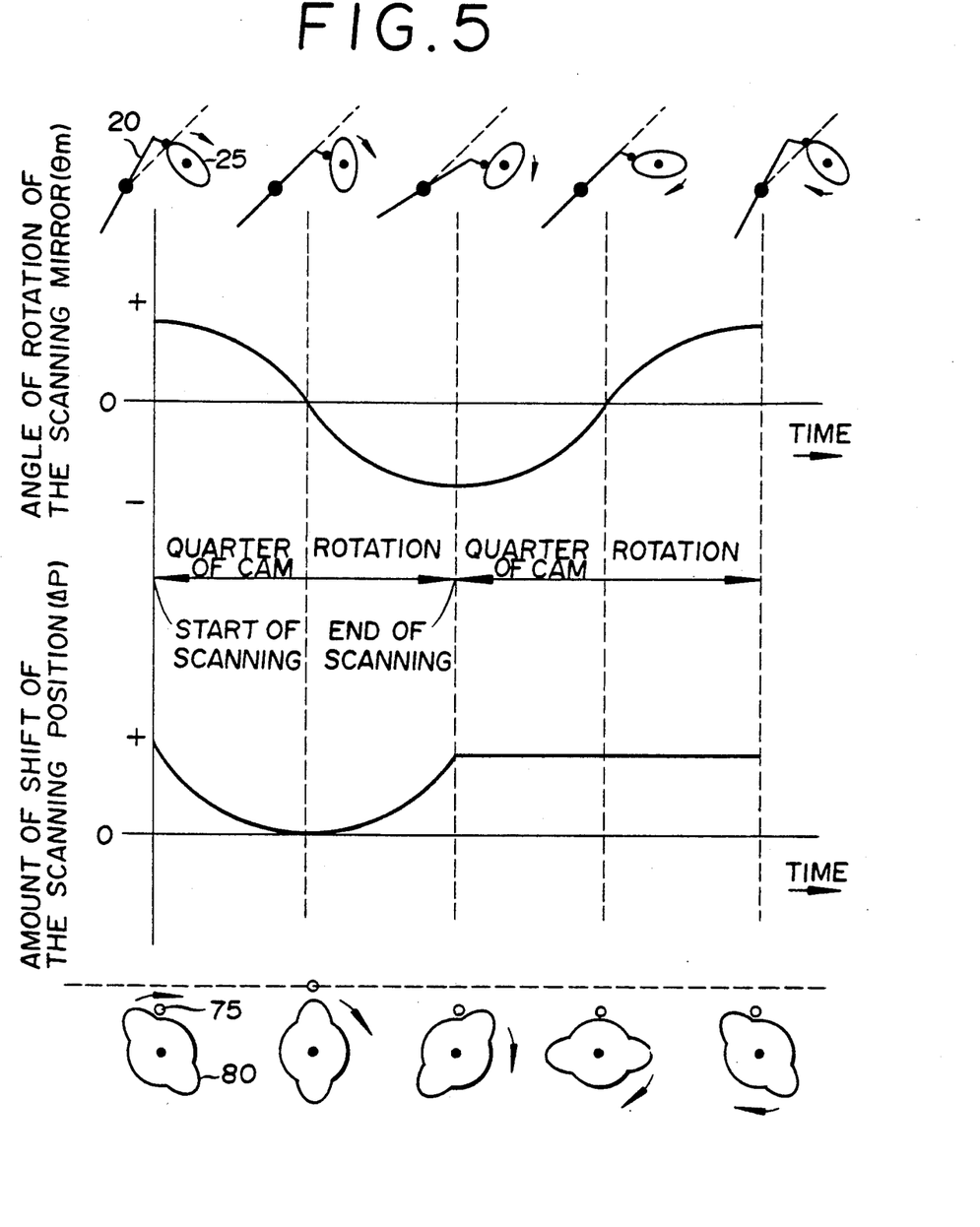
FIG. 5 is a time chart showing the angle of rotation and the amount of shift produced respectively by a cam for the rotation of the scanning mirror and a cam for the shifting of the sensitive material while the cams are each making one half rotation.

FIG. 5 shows changes caused in the angle of rotation $\theta m$ of the scanning mirror 20 and the amount of shift $\Delta P$ of the scanning position while the cams 25 and 80 mentioned above are each making one half rotation. The cams 25 and 80 are symmetrically shaped through the medium of 180 degrees of rotation so that one image projection is effected by one half rotation of the cams. The former one quarter rotation of these cams effects image scanning and the latter one quarter rotation thereof effects return of the scanning mirror 20 to the home position.

In the illustrated embodiment, when the scanning position of the sensitive belt 51 is shifted, the electric charger 53, the cleaner 56, and the eraser lamp 57 are shifted proportionately to the shift of the scanning position so as to maintain their proper distances from the surface of the sensitive belt 51. The sensitive belt 51 is shifted from the position indicated by a two-dot chain line to the position indicated by a solid line and further from the position indicated by a solid line to the position indicated by a two-dot chain line illustrated in FIG. 4. The electric charger 53 and the eraser lamp 57 are set fast in position inside a casing 90. This casing 90 is attached to a supporting frame (omitted from illustration) so as to be freely rotated about a pin 92 as a fulcrum. An arm member 91 which is disposed in the casing 90 is constantly kept in contact with the supporting shaft 75 of the roller 71 by means of a tensile coil spring 93 attached to the arm member 91. When the roller 71 is shifted, the part of the sensitive belt 51 which falls between the rollers 71 and 74 is displaced and the electric charger 53 and the eraser lamp 57 are integrally moved in response to the displacement so that their distances from the surface of the sensitive belt 51 are maintained constantly.

Figure 4:
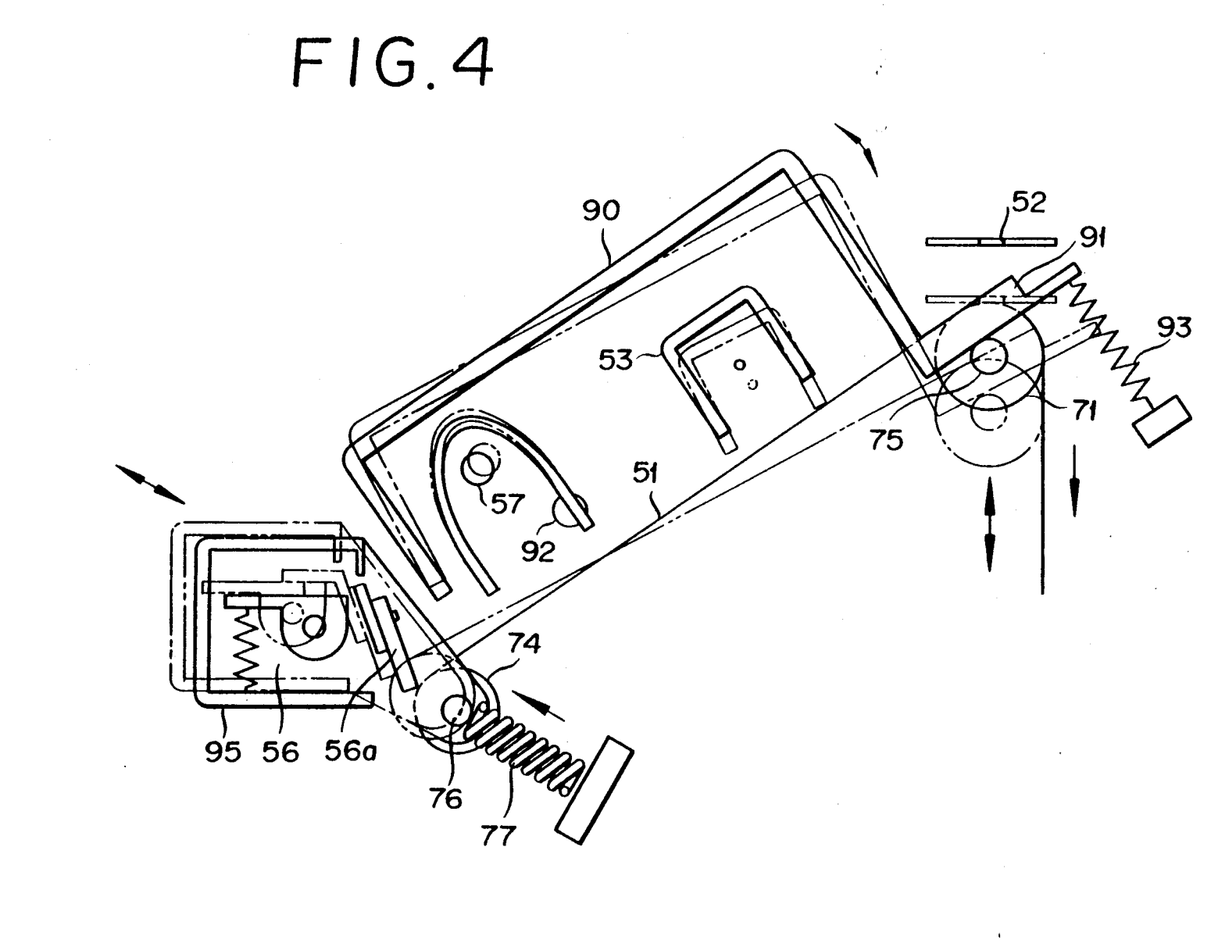
FIG. 4 is an explanatory diagram illustrating the shift interlocking mechanism for component parts disposed around a sensitive material belt and operated for the process of image formation.

The roller 74 is supported by a supporting member (omitted from illustration) so as to be freely moved proportionately to the shift of the roller 71. The cleaner 56, as illustrated in FIG. 4, is diposed inside a casing 95. For the purpose of constantly keeping a blade 56a of the cleaner 56 pressed against the surface of the sensitive belt 51, the casing 95 is connected to a supporting shaft 76 of the roller 74 and reciprocated as shown by arrow marks. The roller 74 is kept resiliently urged outwardly by a compressive coil spring 77 attached to part of the supporting shaft 76 so as to impart tensile force to the sensitive belt 51. Even when the scanning position is shifted and the rollers 74 and 75 are consequently displaced, the other rollers 72 and 73 are not displaced and the developing device 54 and the electric charger 55 are immobilized at their home positions.

Figure 6:
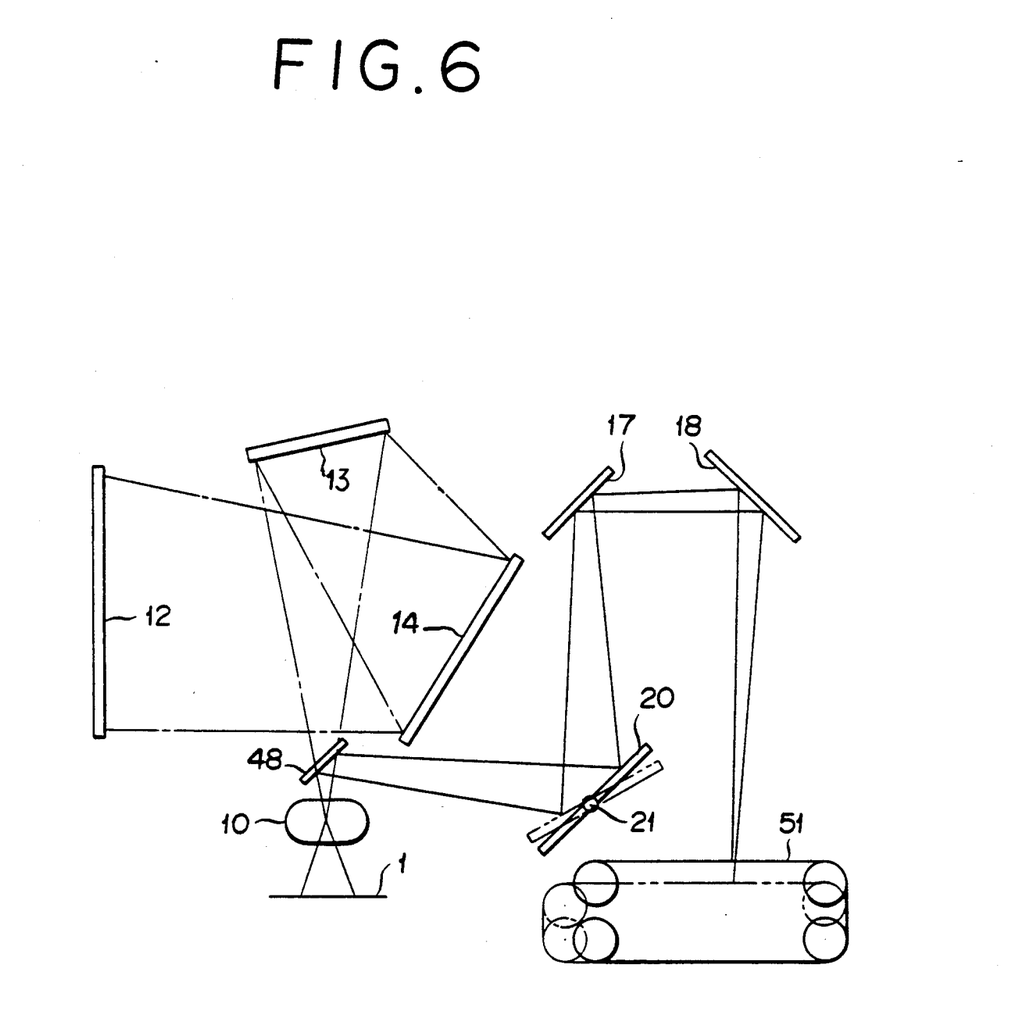
FIG. 6 is a schematic diagram illustrating another example of the reader printer.

FIG. 6 is a schematic diagram illustrating another representative reader printer. In this diagram, like component parts found in the preceding embodiment are denoted by like reference numerals. The rotating mechanism for the scanning mirror 20 and the shifting mechanism for the sensitive belt 51 are basically identical with those of the preceding embodiment. In the present embodiment, a half mirror 48 for dividing the bundle of rays into the part for the reader and the part for the printer is set in place directly behind the projecting lens 10. This half mirror 48 is positioned on the optical axis of the projecting lens 10. About 50% of the bundle of rays is passed through the half mirror 48 and is projected onto the screen 12 via the first mirror 13 for the reader and via the second mirror 14 which is immobilized in the illustrated case. The remaining about 50% of the bundle of rays is reflected by the half mirror 48 toward the scanning mirror 20 and projected onto the sensitive belt 51 via a third mirror 17 and a fourth mirror 18. In the reader printer illustrated in FIG. 6, the operation thereof in the reader mode and that in the printer mode can be simultaneously carried out and the mirror needs not be moved during the switch of mode.

The shifting operation of the sensitive belt 51 can be also accomplished by wholly moving the image-forming unit 50. In this case, the sensitive material in the shape of a drum and not in the shape of a belt can be used. Further, the rotating mechanism for the scanning mirror 20 and the shifting mechanism for the sensitive belt 51 may be used in various constructions other than those illustrated in FIG. 3.

While this invention has been illustrated and described in accordance with a preferred embodiment, it is recognized that variations and changes may be made and equivalents employed herein without departing from the invention as set forth in the claims.

What is claimed is:

1. An image-forming apparatus, comprising:
   an image-forming medium capable of motion in one direction;
   image-projecting means capable of projecting an image to be formed on said image-forming medium;
   a reflecting member disposed rotatably within a path for a beam of rays projected by said image-projecting means and adapted to reflect the projected image in the direction of said image-forming medium;
   driving means capable of rotating said reflecting member thereby effecting the scanning of the image projected on said image-forming medium: and
   shift means capable of shifting the scanning position of said image-forming medium synchronously with the rotation of said reflecting member.

2. An apparatus according to claim 1, wherein said driving means is capable of driving said reflecting member synchronously with the speed of movement of said image-forming medium.

3. An apparatus according to claim 2, wherein said shifting means is capable of shifting said image-forming medium proportionately to the angle of rotation of said reflecting member.

4. An apparatus according to claim 3, wherein said shifting means is capable of shifting the scanning position of said image-forming medium along the direction of the optical axis of the projected image.

5. An apparatus according to claim 3, wherein said driving means is provided with a rotatably disposed cam and said reflecting member is operated by said cam.

6. An apparatus according to claim 5, wherein said shifting means is provided with a rotatably disposed cam and said image-forming medium is shifted by said cam.

7. An image-forming apparatus, comprising:
   an image-forming medium capable of motion in one direction;
   processing means disposed around said image-forming medium and adapted to act on said image-forming medium and effect image formation:
   image-projecting means capable of projecting an image to be formed on said image-forming medium;
   a reflecting member rotatably disposed inside a path for a beam of rays projected by said image-projecting means and adapted t reflect the projected image in the direction of said image-forming medium;
   driving means capable of rotating said reflecting member thereby effecting the scanning of the image projected on said image-forming medium; and
   shifting means capable of shifting the scanning position of said image-forming medium synchronously with the rotation of said reflecting member and, at the same time, shifting said processing means in conjunction with said image-forming medium.

8. An image-forming apparatus, comprising:
   an image-projecting means capable of projecting an image on a film;
   a path for projected light capable of leading the image projected by said image-forming means in the direction of a screen or an image-forming medium capable of motion in one direction:
   a reflecting member disposed rotatably within said path for the projected light:
   driving means capable of rotating said reflecting member for the purpose of scanning the image projected on said image-forming medium; and
   a shifting means capable of shifting the scanning position of said image-forming medium synchronously with the rotation of said reflecting member.

9. An apparatus according to claim 8, wherein said driving means is capable of driving said reflecting member synchronously with the speed of movement of said image-forming apparatus.

10. An apparatus according to claim 9, wherein said shifting means is capable of shifting said image-forming medium proportionately to the angle of rotation of said reflecting member.

11. An apparatus according to claim 10, wherein said shifting means is capable of shifting the scanning position of said image-forming medium along the direction of the optical axis of said image projection.

12. An apparatus according to claim 10, wherein said driving means is provided with a rotatably disposed cam and said reflecting member is driven by said cam.

13. An apparatus according to claim 12, wherein said shifting means is provided with a rotatably disposed cam and said image-forming medium is shifted by said cam.

14. An image-forming apparatus, comprising:
   an image-forming medium capable of motion in one direction;
   image-projecting means capable of projecting an image to be formed on said image-forming medium so as to effect the focusing of said image on a prescribed flat surface;
   a plane mirror member rotatably disposed within a path for a beam of rays projected by said image-projecting means and adapted to reflect the projected image in the direction of said image-forming medium;
   driving means capable of rotating in a prescribed angle said plane mirror member synchronously with the movement of said image-forming medium thereby effecting the scanning of the image projected on said image-forming medium; and
   shifting means capable of shifting said image-forming medium along the optical axis of said path for projected image proportionately to the angle of rotation of said plane mirror member.

15. An apparatus according to claim 14, wherein said shifting means is capable of shifting the scanning position of said image-forming medium to the image-focusing position of the projected image.

16. An apparatus according to claim 15, which further comprises a processing means disposed around said image-forming medium and adapted to act on said image-forming medium and effect image formation and wherein said shifting means is capable of shifting said processing means synchronously with said image-forming medium.

* * * * *